(12) United States Patent
Lovell

(10) Patent No.: US 12,730,462 B2
(45) Date of Patent: Sep. 8, 2026

(54) CONTROL SYSTEM WITH DYNAMIC REFERENCE PRESSURE

(71) Applicant: Fisher Controls International LLC, Marshalltown, IA (US)

(72) Inventor: Michel K. Lovell, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 212 days.

(21) Appl. No.: 18/464,674

(22) Filed: Sep. 11, 2023

(65) Prior Publication Data

US 2025/0085727 A1 Mar. 13, 2025

(51) Int. Cl.
*G05D 16/20* (2006.01)
*F15B 5/00* (2006.01)

(52) U.S. Cl.
CPC ......... *G05D 16/2013* (2013.01); *F15B 5/003* (2013.01); *G05D 16/2097* (2019.01)

(58) Field of Classification Search
CPC ........... Y10T 137/776; Y10T 137/7791; F15B 5/003; G05D 16/2013; G05D 16/2097
USPC .................................................. 137/487, 503
See application file for complete search history.

(56) References Cited

U.S. PATENT DOCUMENTS 2,264,262 A * 11/1941 Erbguth ................ F16K 31/128 137/505.22
2,362,631 A * 11/1944 Harris .................... G05D 23/12 137/487
2,399,938 A * 5/1946 Pett ...................... G05D 7/0193 251/35
2,606,445 A * 8/1952 Eckman .................... G01F 1/26 137/487
2,664,915 A * 1/1954 Drinker ................. F16K 31/126 236/82
2,714,895 A * 8/1955 Rockwell ................ G01L 7/041 137/86
3,654,837 A * 4/1972 Knapp .................... F15B 11/02 137/503
5,722,454 A * 3/1998 Smith ..................... F16K 17/34 137/503

(Continued)

OTHER PUBLICATIONS

Emerson Automation Solutions, Fisher 1061 Pneumatic Piston Rotary Actuator, https://www.emerson.com/documents/automation/product-bulletin-fisher-1061-pneumatic-piston-rotary-actuator-en-123464.pdf, Product Bulletin, Aug. 2017, printed Feb. 8, 2024, 8 pages.

(Continued)

*Primary Examiner* — William M Mccalister
(74) *Attorney, Agent, or Firm* — Quarles & Brady LLP

(57) ABSTRACT

A fluid control system is provided for controlling flow of a process fluid through a pipeline. The fluid control system can include a valve, one or more instruments in fluidic communication with the valve, and a pressurized chamber. In one example, the pressurized chamber contains the one or more instruments. In one example, the pressurized chamber has a dynamically variable pressure, which corresponds to a pressure in a downstream portion of the pipeline, such as a natural gas pipeline. In another example, the pressurized chamber captures instrument gas bled/leaked from the instruments and reinjects the instrument gas into the downstream portion of the pipeline.

18 Claims, 4 Drawing Sheets

(56) References Cited

U.S. PATENT DOCUMENTS

| | | | | |
|---|---|---|---|---|
| 6,021,808 A * | 2/2000 | Dulac | F24H 9/2007 137/487 |
| 10,606,285 B2 * | 3/2020 | Ding | G01F 25/15 |
| 2003/0234039 A1 * | 12/2003 | Shajii | G01F 1/6965 137/12 |
| 2010/0301238 A1 * | 12/2010 | Krake | F16K 31/423 251/25 |
| 2013/0000754 A1 * | 1/2013 | Bayer | G05D 16/0677 137/505 |
| 2013/0074956 A1 * | 3/2013 | Okitsu | G05D 16/0672 137/505 |
| 2015/0114491 A1 * | 4/2015 | Oksanen | G05D 7/03 137/487 |
| 2017/0199529 A1 * | 7/2017 | Ding | G01F 15/005 |

OTHER PUBLICATIONS

Emerson Automation Solutions, Fisher FIELDVUE DVC6200 Digital Valve Controller, https://www.emerson.com/documents/automation/instruction-manual-fieldvue-dvc6200-hw2-digital-valve-controller-en-123052.pdf, Instruction Manual, Dec. 2022, printed Feb. 8, 2024, 108 pages.

VRG Controls, LLC, RCVC Red Circle Valve Controller, Platinum Natural Gas Solutions, https://static1.squarespace.com/static/5b1ea318710699a445e16ebe/t/60b9265415017769e5590b9e/1622746713798/VRG+Controls+-+RCVC+Red+Circle+Valve+Controller+PtNGS.pdf, date unknown, printed Feb. 8, 2024, 23 pages.

Emerson Automation Solutions, Fisher FIELDVUE DVC6200 Remote Mount Digital Valve Controller, https://www.emerson.com/documents/automation/product-bulletin-fieldvue-dvc6200-remote-mount-digital-valve-controller-en-6856672.pdf, Product Bulletin, Jun. 2020, printed Feb. 8, 2024, 6 pages.

Baker Hughes, Becker Valve Regulator Pilot, https://valves.bakerhughes.com/beckerbecker-productsvalve-regulator-pilot-becker, printed Feb. 8, 2024, 3 pages.

Baker Hughes, VRP-B-CH Series Valve Regulator Pilots, https://dam.bakerhughes.com/m/325a45f70e5a9705/original/bk-vrp-b-ch_series_pilot-iom-gea32437a-english-pdf.pdf, Instruction Manual (Rev. C), Apr. 2021, 36 pages.

* cited by examiner

CONTROL SYSTEM WITH DYNAMIC REFERENCE PRESSURE

CROSS-REFERENCE TO RELATED APPLICATIONS

Not applicable.

BACKGROUND

Fluid control systems can be used in a variety of industrial, commercial, and other settings to regulate, protect, isolate, or maintain pipes, conduits, or other vessels and the flow of fluid therein (e.g., within a pipeline). In some applications, it may be useful to manage or control fluid flow in pipeline where certain power sources are unavailable. However, typical control systems often vent a portion of the control fluid (e.g., pipeline gas), which can result in loss of valuable material (e.g., natural gas), and may incur regulatory consequences.

SUMMARY

Some embodiments of the invention provide a fluid control system for controlling flow of a process fluid through a pipeline. The fluid control system can include a valve, one or more instruments in fluidic communication with the valve, and a pressurized chamber. In one example, the pressurized chambers contains the one or more instruments. In one example, the pressurized chamber has a dynamically variable pressure, which corresponds to a pressure in a downstream portion of the pipeline, such as a natural gas pipeline.

Some embodiments of the invention provide a fluid control system for controlling flow of a process fluid through a pipeline. The fluid control system can include a valve, one or more instruments in fluidic communication with the valve, and a pressurized chamber. In one example, the pressurized chambers contains the one or more instruments. In one example, the one or more instruments receive instrument gas, which may be leaked or bled into the pressurized chamber. The pressurized chamber may capture the instrument gas leaked or bled from the instruments and reinject the instrument gas into a downstream portion of the pipeline.

Some embodiments of the invention provide a fluid control system. The fluid control system includes a pressurized chamber fluidically connected to a pipeline (e.g., a natural gas pipeline) via a vent. In one example, the pressurized chamber contains one or more pneumatic instruments. The pressurized chamber may have a dynamically variable pressure corresponding to a pressure in the pipeline. In one example, the one or more instruments within the pressurized chamber have a reference pressure greater than or equal to the pressure in the pipeline. Thus, instrument gas released by the one or more instruments is captured within the chamber and reinjected into the pipeline via the vent.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
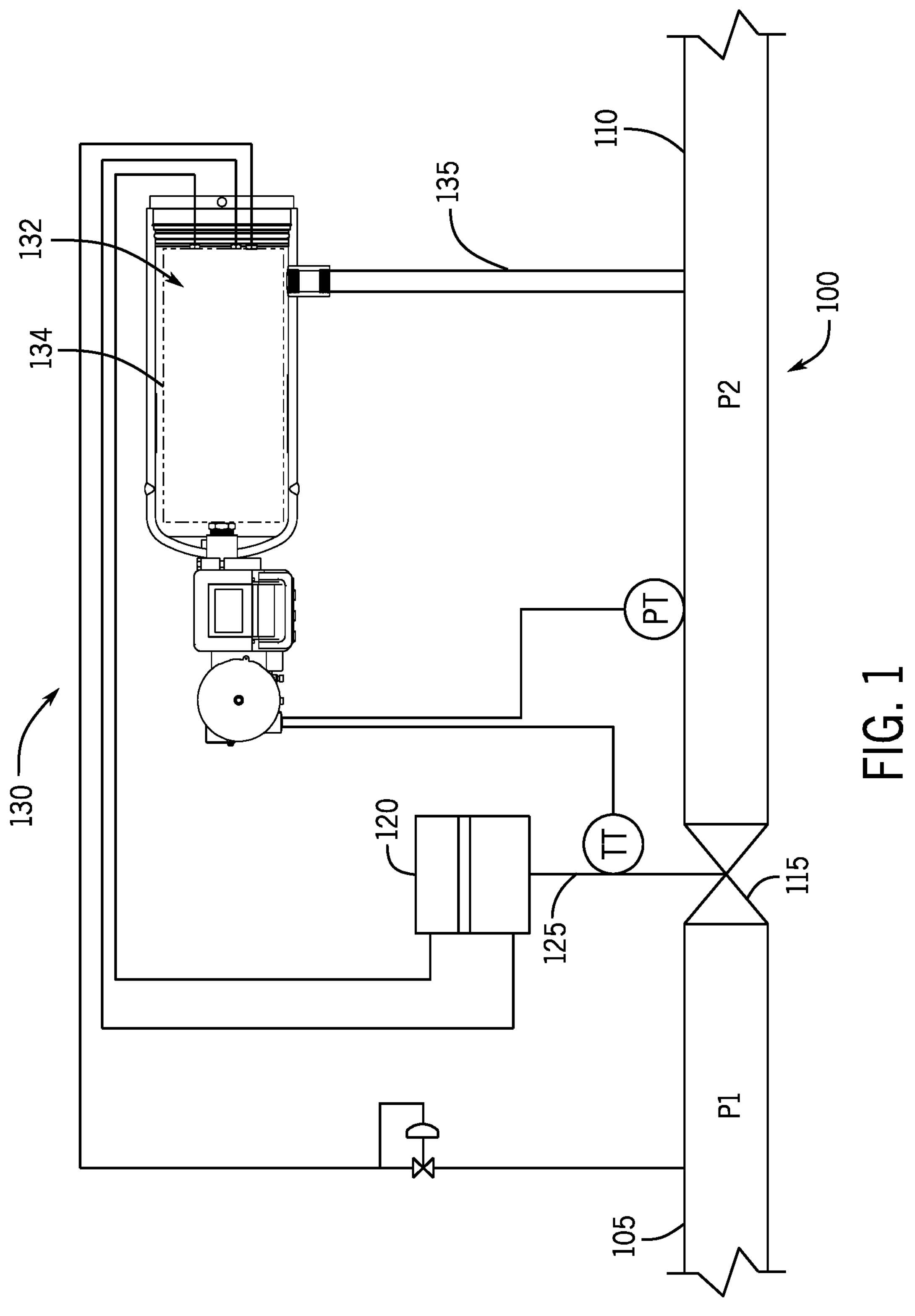
FIG. 1 is a schematic view of an example of a pipeline according to aspects of the present disclosure.

The following discussion is presented to enable a person skilled in the art to make and use embodiments of the invention. Given the benefit of this disclosure, various modifications to the illustrated embodiments will be readily apparent to those skilled in the art, and the principles herein can be applied to other embodiments and applications without departing from embodiments of the invention. Thus, embodiments of the invention are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As briefly discussed above, fluid control systems can be used in a variety of industrial, commercial, and other settings to control fluid flow through pipes, conduits, or other vessels. For example, some process systems, including off-shore drilling wells, oil fields, natural gas transmission pipelines, etc. may (occasionally) require valve actuation at remote or difficult to access sites. Such remote sites may lack a reliable power source, or may otherwise be sometimes subject to power loss events, and thus would benefit from systems for valve actuation without outside power sources, and without unnecessary loss of fluid (e.g., natural gas).

Embodiments of the invention can provide a fluid control system having pressurized chamber configured to enable venting of control fluid (e.g., instrument gas) back into the pipeline, without loss of the fluid to the atmosphere. In one example, the pressurized chamber has a dynamic pressure, and is directly connected to a downstream portion of the pipeline. Put differently, the control system can be configured so that the pressure inside of the pressurized chamber matches or exceeds the pressure of the downstream portion of the pipeline. Thus, as the pressure in the downstream pipeline changes, the pressure within the chamber may correspondingly change, and fluid vented into the chamber can naturally flow from the chamber back into the pipeline.

Generally, the fluid control systems disclosed herein can be further configured to actuate a valve without an outside source of electricity. For example, embodiments of the invention can provide a valve positioner, such as a nozzle flapper type transducer, configured to operate without leakage of control fluid to the atmosphere. Instead, the fluid leakage is captured within the pressurized chamber and vented (i.e., re-injected) back into the downstream portion of the pipeline (e.g., downstream of a control valve controlled by the valve positioner). To accomplish this, one or more instruments held within the pressurized chamber can operate with reference to the "floating" or dynamic reference pressure within the chamber, which is based on a pressure of the downstream portion of the pipeline. Thus, the instruments are able to vent fluid into the downstream pipeline, without venting any fluid to the atmosphere.

In some example, a pressurized chamber can contain instruments (e.g., pneumatic instruments) that are conventionally used at lower pressures (e.g., conventional controllers and positioners). As similarly discussed above, this can be accomplished by increasing the pressure surrounding the instruments from atmospheric pressure to a controlled process pressure, typically the pressure in the downstream portion of the pipeline. Because the chamber pressure is equal to (or greater than) the downstream pressure, any fluid consumed by the instruments can thus be re-injected into the pipeline. This can eliminate bleed to the atmosphere, while still allowing the use of various conventional instruments. For example, an instrument that is rated to operate based on a particular differential pressure relative to a standard environment (e.g., with a standard pressure equal to 1 atmosphere or 14.7 Pounds Per Square Inch Absolute (PSIA)), can be similarly operated at a higher absolute pressure, but with the same (rated) differential pressure, in the environment of elevated pressure provided by the pressurized chamber.

Put differently, the traditional design and operation of pneumatic instrumentation used in process control industries is predicated on a static reference pressure equal to the local atmospheric pressure. These instruments can be integrated into a control system because each instrument has a common reference pressure (e.g., local atmospheric pressure). The common atmospheric reference pressure also ensures that the gas consumed by the instruments can be vented when required. In contrast, in examples described herein, an alternate reference pressure can be provided to the pneumatic instruments that can be elevated and dynamic in nature. Thus, for example, as the reference pressure (e.g., downstream pipeline pressure) fluctuates the pneumatic instrument pressures can "float" with the reference pressure fluctuation, so that sufficient pressure differential is maintained to operate the instruments and sufficient output pressure is maintained to reinject the working fluid into the pipeline. This allows the instruments to provide accurate and responsive control while also venting into the downstream pipeline, substantially eliminating venting of the gas to the atmosphere.

FIG. 1 illustrates an example of a pipeline 100. In one example, the pipeline 100 may be a natural gas pipeline. In one example, the pipeline 100 may include a valve 115 situated within a pipe of the pipeline 100. The valve 115 may control fluid flow rate, pressure, or other factors between an upstream portion 105 (with respect to valve 115) and a downstream portion 110 (with respect to valve) of the pipeline 100. The valve 115 may be any of a variety of known types, such as a ball valve, gate valve, butterfly valve, diaphragm valve, globe valve, plug valve, check valve, or any other form of valve used to modify pipeline pressure or flow. In one particular example, the valve may be a push down to close valve with fail open actuation.

In the illustrated example, the valve 115 is in fluid communication with a process fluid (e.g., natural gas, oil, water, or other fluids) flowing through the pipeline 100. The valve 115 may be stroked (i.e., moved/actuated) via an actuator 120 to close, open, or otherwise adjust a position of a valve stem 125 of the valve 115 to generate a predetermined pressure or flow rate of fluid in the downstream portion 110 of the pipeline 100. In one example (as shown), the actuator 120 may be a double acting piston type actuator. In another example, the actuator may be a single acting piston type actuator, or may have other known configurations. In some examples, the actuator may include a biasing element 140 (e.g., spring) configured to cause the actuator to "fail-open". In other examples, the biasing element may be positioned or configured to cause the actuator to "fail-closed". As should be appreciated, the biasing element 140 may operate the actuator in certain situations, such as situations with insufficient differential pressure (dP) to operate the actuator 120.

In one example, the pipeline 100 includes a fluid control system 130, including a fluid-powered instrument assembly 134 (e.g., of various known configurations) to control operation of the valve via control of the actuator 120. In one example, the pneumatic instruments can operate via the use of instrument gas, which may be siphoned or taken from the upstream portion 105 of the pipeline and re-injected into the downstream portion 110 of the pipeline 100 after use. In particular, the fluid control system 130 can function in a zero-emission state, meaning that the system 130 functions without the loss of gas (e.g., pipeline gas) to the atmosphere. As should be appreciated, this configuration can help to prevent loss of valuable material (e.g., via loss of gas) and avoidance of release events that may incur reporting requirements or other regulatory consequences (e.g., relating to venting of natural gas to atmosphere).

In the illustrated example, to accomplish this zero-emission state, one or more of the instruments (e.g., positioners, relays, regulators, volume boosters, trip valves, etc.) of the instrument assembly 134 that are used to control operation of the valve 115 are contained within a pressurized chamber 132 (e.g., as provided using known types of pressure vessels or other pressure-containment structures). In one example, the control system 130 is designed to float (or dynamically adjust) an internal pressure of the chamber 132 to match or exceed a pressure (P2) in the downstream portion 110 of the pipeline 100. In particular, as further discussed below, the control system 130 can be configured to ensure appropriate input pressure to the instrument assembly 134 so that fluid exhausted by the instrument assembly 134 (e.g., after a known operational pressure drop) is sufficiently high to be reinjected (by natural, pressure-driven flow) into the pipeline portion 110.

Put differently, the pressurized chamber 132 of the control system 130 can be a closed system with respect to the atmosphere. Thus, instead of referencing the atmospheric pressure, the instruments inside of the chamber 132 can instead reference the pressure in the downstream portion 110 of the pipeline 100. Thus, any instrument gasses vented or otherwise lost from the control system 130 can be reinjected into the downstream portion 110 of the pipeline 100 via vent 135 (e.g., a simple plumbed connection), without further pressurization (and corresponding power requirements).

Similarly, the flow of gas between the chamber 132 and the downstream portion 110 of the pipeline 100 via the vent 135 enables the chamber 132 and the downstream portion 110 of the pipeline 100 to reach an equilibrium, with the chamber (and instrument reference) pressure changing based on the pressure in the downstream portion 110 of the pipeline 100.

Figure 2:
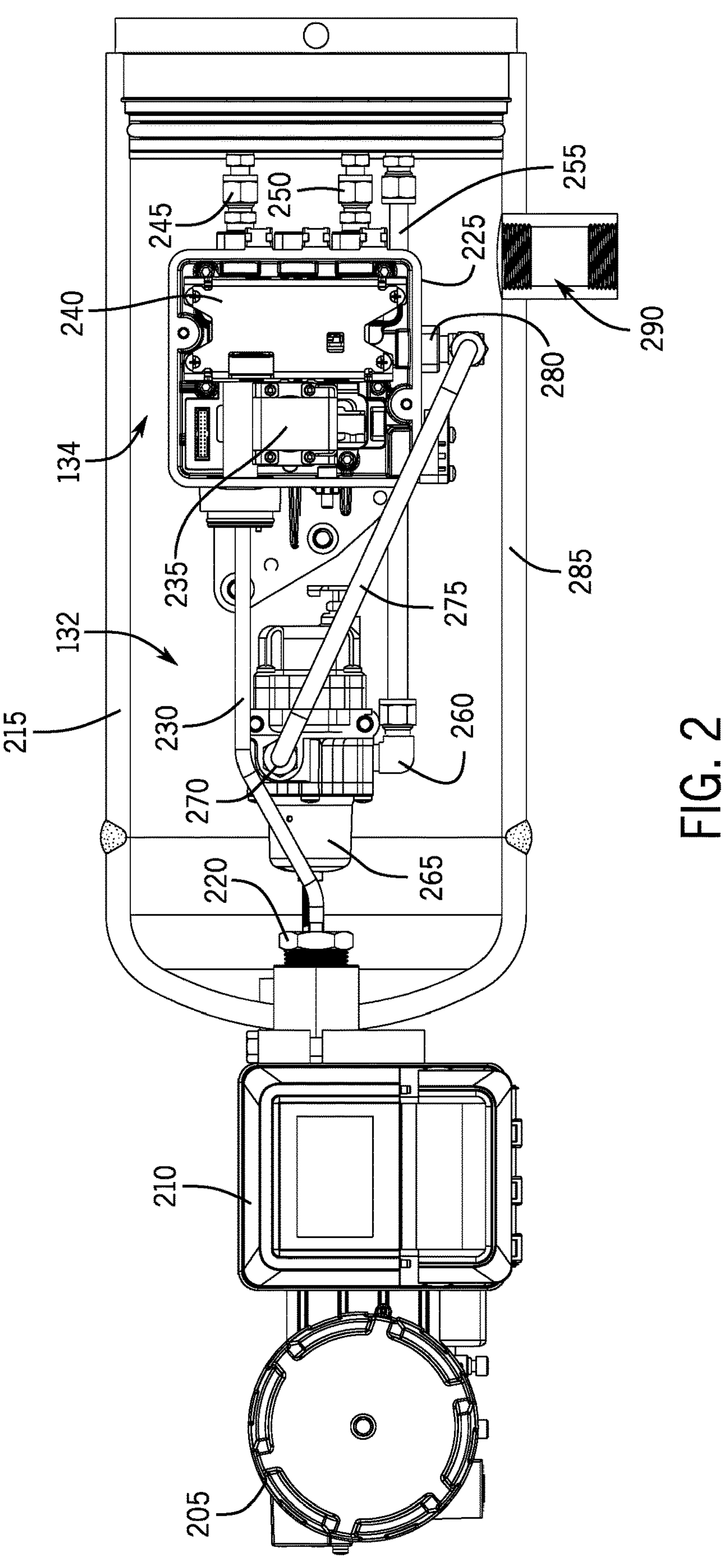
FIG. 2 is a sectional view of an example fluid control system for use with the pipeline of FIG. 1.

FIG. 2 illustrates a detailed view of an example configuration of the instrument assembly 134 of the fluid control system 130 including one or more instruments (e.g., pneumatic instruments). As mentioned previously, the fluid control system 130 generally includes one or more instruments configured to adjust a position of the valve 115 (see FIG. 1) in order to reach a predetermined pressure (P2) or flow rate in the downstream portion 110 of the pipeline 100. In one example, a terminal box 205 and a controller 210 are located outside of the chamber 132. The terminal box 205 (e.g., of various known configurations) can be configured to receive one or more electrical connections from one or more sensors, such as valve position sensors, pressure sensors, or other sensors (see, e.g., temperature and pressure sensors as indicated in FIG. 1). The controller 210 is electrically connected to the terminal box 205 and is configured to receive/transmit information (e.g., valve position, downstream pipeline pressure, etc.) from/to the one or more sensors and determine if an adjustment to valve 115 is needed. In one example, the controller 210 is configured to automatically regulate and/or adjust downstream pipeline pressure (P2) or flow rate via adjustment of the control valve position.

In one example, the terminal box 205 and the controller 210 are electrically connected to an instrument module 225 within the chamber 132 via a cable 230. In one example, the cable 230 extends through a sidewall 215 of the chamber 132 via a seal 220. In one example, the seal 220 is a hermetic seal configured to prevent the passage of fluid, such as air or other gasses between the atmosphere (e.g., area outside of chamber 132) and the interior of the chamber 132. In one example, the instrument module 225 includes an i/p converter 235 (e.g., 4-20 mA and 3-15 PSI) and a pneumatic relay 240. In other examples, the instrument module 225 may include other instruments, such as volume boosters, trip valves, regulators, low-bleed pilots, positioners, nozzle flapper transducers, or other instruments. In one example, the i/p converter 235 is a nozzle flapper transducer. The relay 240 can be fluidically connected to the i/p converter 235 within the instrument module 225 to implement controlled routing of instrument gas into either a first port 245 or a second port 250 based on instructions received from the controller 210.

Within the chamber 132 of the fluid control system 130 a regulator input line 255 supplies instrument gas to an input port 260 of a supply regulator 265 that is configured to regulate a pressure of the instrument gas. For example, the regulator 265 can regulate gas pressure from the regulator input line 255 to ensure a predetermined differential pressure value for operation of the instrument module 225 so that exhausted gas can still be reinjected into the pipeline 100. Thus, in one example, the supply regulator 265 references the pressure in the downstream portion 110 of the pipeline 100 instead of atmospheric pressure. Correspondingly, in one example, the supply regulator 265 can have a pressure setpoint relative to the dynamic reference pressure (i.e., pressure in downstream portion of pipeline (P2)).

The supply regulator 265 may output regulated instrument gas via an output port 270 to into an output supply line 275. The output supply line 275 connects to an input port 280 on the instrument module 225 to supply pressure-regulated gas to the instrument module 225. In one example, the pressure regulated gas flows through the i/p converter 235 and the relay 240 based on an electrical signal sent to the instrument module 225 from the controller 210. Thus, gas from the supply regulator 265 is directed through the first port 245 or the second port 250 by the relay 240 based on the electrical signal sent from the controller 210. As should be appreciated, applying gas to either the first port 245 or the second port 250 may adjust a position of the actuator 120 (see FIG. 1), which may modify the pressure and/or flow rate within the downstream portion 110 of the pipeline 100.

In some examples, the i/p converter 235 may experience leakage (e.g., constant leakage), which results in an escape of instrument gasses. In this case, the leaked instrument gasses are released into the chamber 132. In one example, due to the reference pressure within the chamber 132 being based on the downstream pipeline pressure (P2), the leaked gas is at a pressure greater than or equal to the pressure in the downstream portion 110 of the pipeline 100. Thus, the leaked instrument gasses can flow through an opening 290 in a sidewall 215 of the pressurized chamber 132 to be reinjected into the downstream portion 110 of the pipeline 100 via the vent 135. As a result, no gas is released into the atmosphere, helping to save cost and meet relevant regulations.

Figure 3:
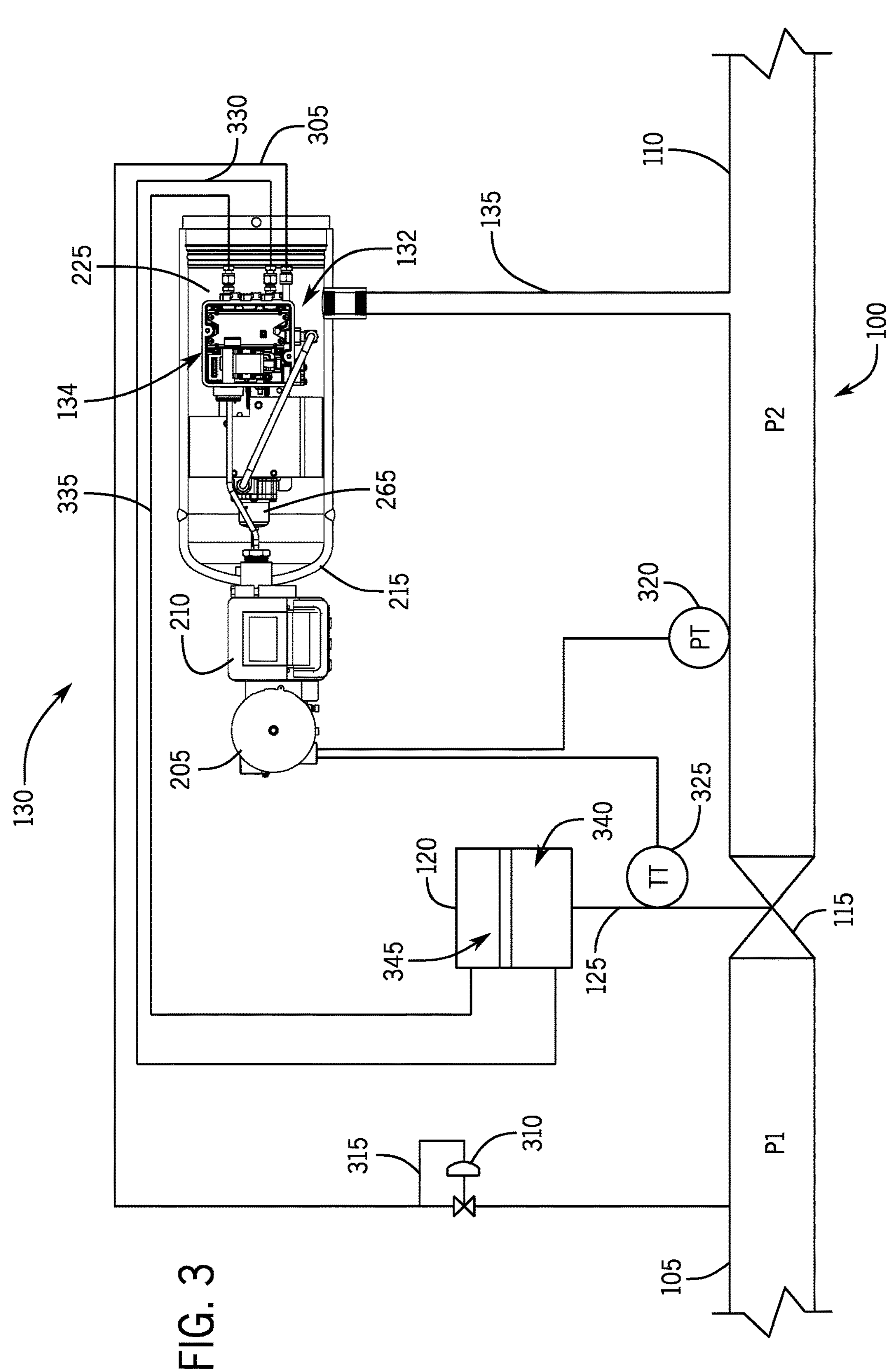
FIG. 3 is a schematic view of the pipeline of FIG. 1, equipped with the fluid control system of FIG. 2.

In the example shown in FIG. 3, the instrument assembly 134 as configured in FIG. 2 is installed for operation with the control system 130 of FIG. 1. Thus, for example, the supply regulator 265 receives instrument gas from the upstream portion 105 of the pipeline 100 via a supply line 305. In some examples, the supply line 305 may include a regulator 310 (e.g., a high-pressure regulator) configured to reduce or otherwise regulate the pressure in the supply line 305 to a predetermined pressure value. In one example, the predetermined pressure value is a calculated value equal to the maximum allowable operating pressure (MOAP) of the downstream portion 110 of the pipeline 100, plus a differential pressure for operation of the actuator 120 (via the instrument assembly 134), plus a safety factor (e.g., 2-15 PSI). In one example, the regulator 310 may include a monitor line 315 configured to monitor the pressure in the supply line 305 just downstream from the regulator 310. In one example, the regulator 310 may self-regulate or adjust based on the pressure monitored by the monitor line 315.

As mentioned previously, the controller 210 is configured to monitor the position of the actuator 120 and the pressure in the downstream portion 110 of the pipeline 100 to determine if adjustment of the valve 115 is needed. In one example, the terminal box 205 and the controller 210 are positioned outside of the chamber 132 (i.e., exposed to/referenced to atmospheric pressure). In one example, the terminal box 205 is electrically (e.g., hardwired and/or wirelessly) connected to a pressure transducer 320 and a travel transducer 325. The pressure transducer 320 is configured to monitor and report the pressure (P2) in the downstream portion 110 of the pipeline 100. The travel transducer 325 is configured to monitor and report the position of the actuator 120 (corresponding to a position of the valve 115). In one example, the pressure transducer 320 is positioned outside of the pressurized chamber 132, to provide a gauge pressure reading of the downstream portion 110 (with respect to atmospheric pressure).

In one example, the instrument module 225 is connected to a first line 335 and a second line 330 via the first port 245 and the second port 250, such that the relay 240 (see FIG. 2) controls instrument gas flow into the first line 335 or the second line 330. In the example illustrated, instrument gas flow into the first line 335 supplies gas to a first side 345 of the actuator 120, which restricts gas flow through the valve 115 (e.g., closes valve 115). Similarly, instrument gas flow into the second line 330 supplies gas to a second side 340 of the actuator 120 (i.e., side containing biasing element 140), which increases gas flow through the valve 115 (e.g., opens valve 115). Throughout the valve actuation process, the controller 210 may monitor the pressure transducer 320 and travel transducer 325. During such actuation, as also discussed above, any working gas that vented from the instruments is captured within the chamber 132 and vented into the downstream portion 110 of the pipeline via the vent 135. Thus, the control system 130 operates in a zero-emission state, without loss of gas to the atmosphere.

Figure 4:
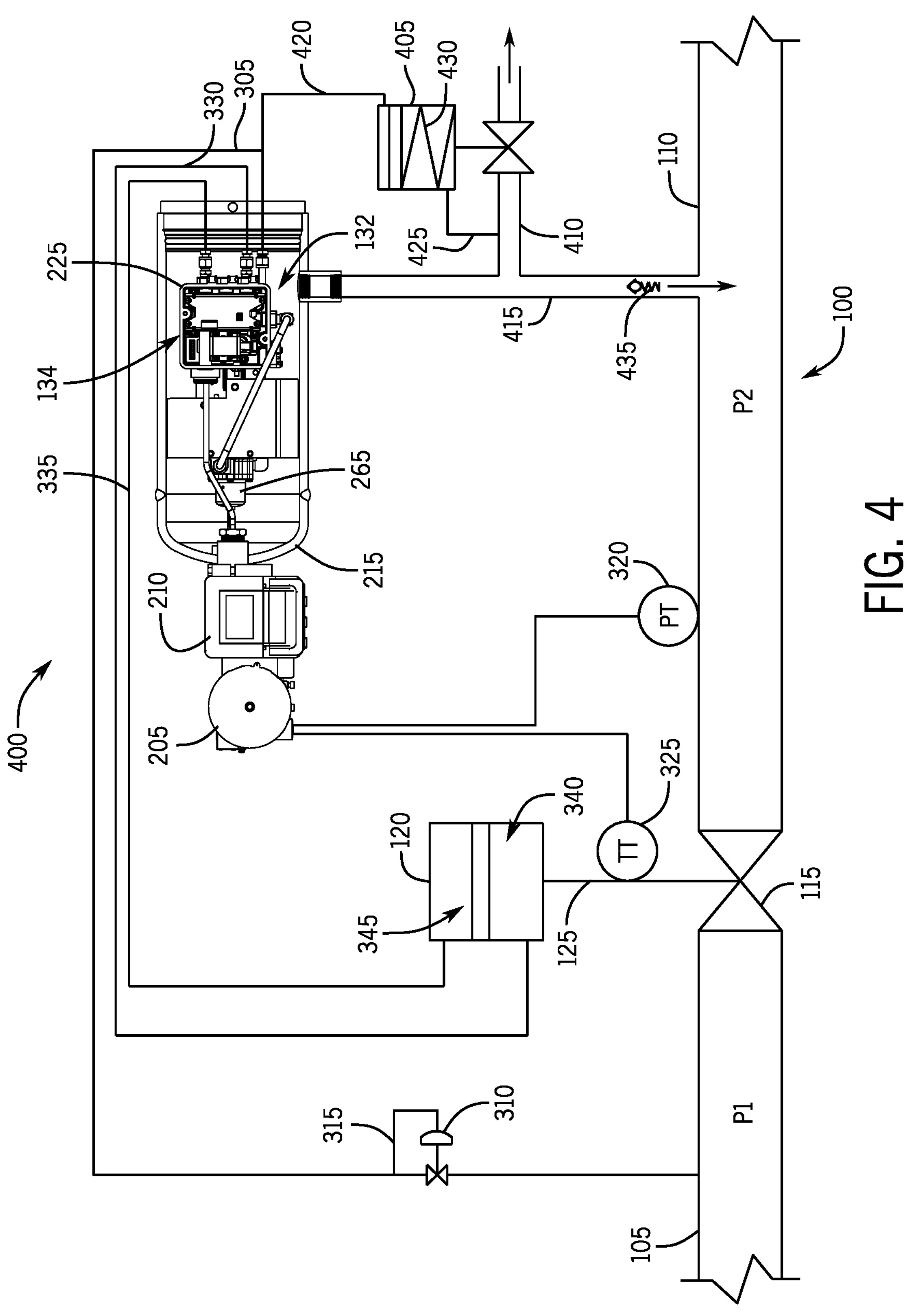
FIG. 4 is a schematic view of the pipeline of FIG. 1, equipped with another example fluid control system.

FIG. 4 illustrates another example of a fluid control system 400 that can be used with the pipeline 100 of FIG. 1 (e.g., as an alternative configuration of the fluid control system 130). As will be recognized, the fluid control system 400 shares a number of components in common with and operates in a similar fashion to the examples illustrated and described previously. For the sake of brevity, these common features will not be again described below in detail. Rather, previous discussion of commonly named or numbered features, unless otherwise indicated, also applies to example configurations of the fluid control system 400.

In some cases, the fluid control system 400 may include a differential pressure regulator 405 arranged on an atmospheric vent 410. The atmospheric vent 410 may be configured to allow the selective venting of fluid (e.g., control fluid or instrument gas) to the atmosphere (e.g., during periods of insufficient differential pressure to operate one or more instruments). In one example, the control system 400 may automatically transition from the zero-emission state (e.g., regulator 405 closed) to a bleed state (e.g., regulator 405 open), without operator intervention or outside power sources.

In one example, the atmospheric vent 410 may extend from a vent 415 (e.g., similar to vent 135 described previously). The differential pressure regulator 405 may selectively permit or inhibit fluid flow from the vent 415 to the atmosphere based on one or more pipeline conditions. For example, the differential pressure regulator 405 may permit fluid flow from the vent 415 to the atmosphere (e.g., open regulator 405) when there is insufficient differential pressure to operate the actuator 120 (e.g., pressure in the upstream portion 105 of the pipeline 100 is substantially similar to pressure in the downstream portion 110 of the pipeline 100). In another example, the differential pressure regulator 405 may permit fluid flow from the vent 415 to the atmosphere during periods of high demand (e.g., during winter or other extreme weather conditions). In yet another example, the differential pressure regulator 405 may inhibit fluid flow from the vent 415 to the atmosphere (e.g., close regulator 405) when there is sufficient differential pressure between the upstream portion 105 of the pipeline 100 and the downstream portion 110 of the pipeline 100. In this case, the fluid control system 400 may operate in a zero-emission state with fluid from the pressurized chamber 132 passing through the vent 415 and re-injected into the downstream portion 110 of the pipeline 100.

In one example, the differential pressure regulator 405 includes a first monitor line 420 and a second monitor line 425. The first monitor line 420 is configured to monitor a pressure in the supply line 305 (e.g., instrument supply line), which corresponds to a pressure in the upstream portion 105 of the pipeline 100. Correspondingly, the second monitor line 425 is configured to monitor a pressure in the vent 415, which corresponds to a pressure in the downstream portion 110 of the pipeline 100. Thus, when a pressure in the supply line 305 is sufficiently larger than a pressure in the vent 415 (e.g., sufficient differential pressure), the regulator 405 is closed, and fluid is not vented to the atmosphere. However, when a pressure in the supply line 305 is not sufficiently larger than a pressure in the vent 415 (e.g., insufficient differential pressure), the regulator 405 is opened, and fluid is vented to the atmosphere until a sufficient differential pressure value is reached. Once a sufficient differential pressure value between the supply line 305 and the vent 415 is reached, the regulator 405 may automatically close.

In one example, the differential pressure regulator 405 may include an adjustable biasing element 430 configured to enable a user to adjust a pressure set point of the differential pressure regulator 405. In one example, the biasing element 430 may be configured to bias the differential pressure regulator 405 into an open position, such that fluid flow from the vent 415 to the atmosphere is permitted. Put differently, the set point of the regulator 405 may be adjusted via the biasing element 430, which may correspond to a pressure in the supply line 305 needed to close the regulator 405 (e.g., inhibit fluid flow from vent 415 to atmosphere). In another example, the set point of the regulator 405 may be adjusted via the biasing element 430, which may correspond to a minimum differential pressure needed to operate the actuator 120.

To prohibit the inadvertent flow (e.g., release) of fluid from the downstream portion 110 of the pipeline 100 to the atmosphere via the atmospheric vent 410, the vent 415 may include a check valve 435 arranged within the vent 410. In one example, the check valve 435 may enable unidirectional fluid flow from the vent 415 into the downstream portion 110 of the pipeline 100, but restrict or inhibit fluid flow from the downstream portion 110 of the pipeline 100 into the vent 415. In one particular example, the check valve 435 may be positioned between the atmospheric vent 410 and the downstream portion 110 of the pipeline 100, within the vent 415.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

Also as used herein, unless otherwise limited or defined, "substantially parallel" indicates a direction that is within ±12 degrees of a reference direction (e.g., within ±6 degrees), inclusive. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction.

Also as used herein, unless otherwise limited or defined, "substantially perpendicular" indicates a direction that is within ±12 degrees of perpendicular a reference direction (e.g., within ±6 degrees), inclusive. For a path that is not linear, the path can be considered to be substantially perpendicular to a reference direction if a straight line between end-points of the path is substantially perpendicular to the reference direction or a mean derivative of the path within a common reference frame as the reference direction is substantially perpendicular to the reference direction.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Additionally, unless otherwise specified or limited, the terms "about" and "approximately," as used herein with respect to a reference value, refer to variations from the reference value of ±15% or less, inclusive of the endpoints of the range. Similarly, the term "substantially equal" (and the like) as used herein with respect to a reference value refers to variations from the reference value of less than ±30%, inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more.

Also as used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

The previous description of the disclosed embodiments is provided to enable any person skilled in the art to make or use the invention. Given the benefit of this disclosure, various modifications to these embodiments will be readily apparent to those skilled in the art, and the principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A fluid control system, comprising:

a valve;

a valve actuator, one or more instruments in fluidic communication with the valve actuator to actuate the valve; and a pressurized chamber, the one or more instruments being positioned within the pressurized chamber so that instrumentation gas passes through the instruments into the pressurized chamber prior to venting to a downstream portion of the pipeline; and wherein the pressurized chamber has a dynamically variable pressure corresponding to a pressure in a downstream portion of a pipeline.

2. The system of claim 1, wherein the one or more instruments within the pressurized chamber have a reference pressure greater than or equal to the pressure in the downstream portion of the pipeline.

3. The system of claim 1, wherein the one or more instruments within the pressurized chamber receive supply gas from a supply regulator positioned within the pressurized chamber.

4. The system of claim 3, wherein the supply regulator receives input gas from an upstream portion of the pipeline via a supply line.

5. The system of claim 1, wherein the one or more instruments includes a nozzle flapper transducer.

6. The system of claim 1, wherein instrumentation gas leaked from the one or more instruments is captured within the chamber and reinjected into the downstream portion of the pipeline via a vent connecting the pressurized chamber and the downstream portion of the pipeline.

7. The system of claim 1, further comprising:

a controller electrically connected between the valve and the one or more instruments within the pressurized chamber;

wherein the controller is positioned outside of the pressurized chamber.

8. A fluid control system, comprising:

a valve;

one or more instruments in fluidic communication with the valve; and a pressurized chamber fluidically connected to a downstream portion of a pipeline, the pressurized chamber having a dynamically variable pressure corresponding to a pressure in a downstream portion of a pipeline;

wherein the one or more instruments are positioned within the pressurized chamber, surrounded by the dynamically variable pressure, so that the dynamically variable pressures sets a reference pressure for the one or more instruments within the pressurized chamber that is greater than or equal to the pressure in the downstream portion of the pipeline; and wherein instrumentation gas released by the one or more instruments is captured within the chamber and reinjected into the downstream portion of the pipeline.

9. The system of claim 8, wherein the one or more instruments within the pressurized chamber receive supply gas from a supply regulator positioned within the pressurized chamber.

10. The system of claim 9, wherein the supply regulator receives input gas from an upstream portion of the pipeline via a supply line.

11. The system of claim 8, wherein the one or more instruments includes a nozzle flapper transducer.

12. The system of claim 8, further comprising:

a controller electrically connected between the valve and the one or more instruments within the pressurized chamber;

wherein the controller is positioned outside of the pressurized chamber.

13. A fluid control system, comprising:

a pressurized chamber fluidically connected to a pipeline via a vent, so that the pressurized chamber has a dynamically variable pressure corresponding to a pressure in the pipeline; and one or more pneumatic instruments held within the chamber, so that the dynamically variable pressure provides a reference pressure for one or more instruments within the pressurized chamber that is greater than or equal to the pressure in the pipeline;

wherein instrumentation gas passes through the one or more pneumatic instruments before being released by the one or more instruments and captured within the chamber; and wherein instrumentation gas captured within the chamber is reinjected into the pipeline via the vent.

14. The system of claim 13, further comprising:

a valve within the pipeline;

wherein the valve separates the pipeline into an upstream portion and a downstream portion;

wherein the upstream portion is upstream of the valve; and wherein the downstream portion is downstream of the valve.

15. The system of claim 14, wherein the one or more instruments within the pressurized chamber receive supply gas from a supply regulator positioned within the pressurized chamber.

16. The system of claim 15, wherein the supply regulator receives input gas from an upstream portion of the pipeline via a supply line.

17. The system of claim 13, wherein the one or more instruments includes a nozzle flapper transducer.

18. The system of claim 14, wherein the instrumentation gas is reinjected into the downstream portion of the pipeline via the vent.

* * * * *